US012559646B2

(12) United States Patent
Kondrat et al.

(10) Patent No.: US 12,559,646 B2
(45) Date of Patent: Feb. 24, 2026

(54) AQUEOUS COATING COMPOSITION CONTAINING AN EPOXY-AMINE SYSTEM AND AN AROMATIC CARBOXYLIC ACID AS CURING CATALYST

(71) Applicant: BASF COATINGS GMBH, Münster (DE)

(72) Inventors: Anna Kondrat, Münster (DE); Egbert Nienhaus, Münster (DE); Joerg Ressel, Münster (DE); Karin Wever, Münster (DE); Silke Przybilla, Münster (DE); Tim Voegeling, Münster (DE); Sibylle Schoeps, Münster (DE)

(73) Assignee: BASF COATINGS GMBH, Muenster (DE)

( * ) Notice: Subject to any disclaimer, the term of this patent is extended or adjusted under 35 U.S.C. 154(b) by 699 days.

(21) Appl. No.: 17/915,568

(22) PCT Filed: Mar. 17, 2021

(86) PCT No.: PCT/EP2021/056756
§ 371 (c)(1),
(2) Date: Sep. 29, 2022

(87) PCT Pub. No.: WO2021/197842
PCT Pub. Date: Oct. 7, 2021

(65) Prior Publication Data
US 2023/0143725 A1    May 11, 2023

(30) Foreign Application Priority Data
Mar. 31, 2020    (EP) .................................... 20167217

(51) Int. Cl.
| | |
|---|---|
| *C09D 163/00* | (2006.01) |
| *B05D 5/00* | (2006.01) |
| *B05D 7/14* | (2006.01) |
| *C08G 59/24* | (2006.01) |
| *C08G 59/50* | (2006.01) |
| *C08G 59/56* | (2006.01) |
| *C08K 5/09* | (2006.01) |
| *C09D 5/00* | (2006.01) |

(52) U.S. Cl.
CPC .......... *C09D 163/00* (2013.01); *B05D 5/005* (2013.01); *B05D 7/14* (2013.01); *C08G 59/245* (2013.01); *C08G 59/5026* (2013.01);

*C08G 59/5033* (2013.01); *C08G 59/56* (2013.01); *C08K 5/09* (2013.01); *C09D 5/002* (2013.01)

(58) Field of Classification Search
CPC ........ C09D 163/00; C09D 5/00; C08G 59/50; C08G 59/56; C08G 59/24; C08K 5/09
USPC .......................................................... 523/414
See application file for complete search history.

(56) References Cited

U.S. PATENT DOCUMENTS 6,572,972 B2    6/2003   Paar et al.

FOREIGN PATENT DOCUMENTS

| | | | |
|---|---|---|---|
| EP | 2028244 A1 | 2/2009 | |
| WO | WO-0136550 A1 * | 5/2001 | .......... C09D 163/00 |
| WO | 2009016162 A1 | 2/2009 | |

OTHER PUBLICATIONS

International Search Report and Written Opinion for PCT/EP2021/056756 issued on Jun. 22, 2021, 9 pages.
European Search Report for EP Patent Application No. 20167217.7 Issued on Sep. 18, 2020, 3 pages.

* cited by examiner

*Primary Examiner* — Deve V Hall
(74) *Attorney, Agent, or Firm* — Armstrong Teasdale LLP

(57) ABSTRACT

Disclosed herein is an aqueous coating composition containing an aqueous epoxy resin dispersion, an aqueous amine-functional resin dispersion and an aromatic carboxylic acid. The aqueous dispersion contains at least one specific di- and/or polyfunctional monomeric amine and at least one resin component including at least one specific polyfunctional organic amine. Further disclosed herein is a kit-of-parts including a base varnish containing the aqueous epoxy resin dispersion and a curing component containing the aqueous amine-functional resin dispersion as well as the aromatic carboxylic acid. Additionally disclosed herein is a process for producing a coating on the substrate as well as coated substrates resulting from said process. Cured coating layers formed from said compositions exhibit a good adhesion to the substrate as well as a high intercoat adhesion and blistering stability under humidity conditions without negatively influencing the excellent sandability and the good stone chipping properties.

20 Claims, No Drawings

AQUEOUS COATING COMPOSITION CONTAINING AN EPOXY-AMINE SYSTEM AND AN AROMATIC CARBOXYLIC ACID AS CURING CATALYST

CROSS-REFERENCE TO RELATED APPLICATIONS

This application is a U.S. National Phase Application of International Patent Application No. PCT/EP2021/056756, filed Mar. 17, 2021, which claims priority to European Patent Application No. 20167217.7, filed Mar. 31, 2020, each of which is hereby incorporated by reference herein.

The present invention relates to an aqueous coating composition, preferably an aqueous sanding surfacer or primer-surfacer, containing an aqueous epoxy resin dispersion (A), an aqueous amine-functional resin dispersion (B) and an aromatic carboxylic acid (C). The aqueous dispersion (B) contains at least one specific di- and/or polyfunctional monomeric amine (A1) and at least one resin component (RC) comprising at least one specific polyfunctional organic amine (A2). Moreover, the present invention relates to a kit-of-parts comprising a base varnish containing the aqueous epoxy resin dispersion (A) and a curing component containing the aqueous amine-functional resin dispersion (B) as well as the aromatic carboxylic acid (C). Additionally, the present invention relates to a process for producing a coating on the substrate as well as coated substrates resulting from said process. Cured coating layers formed from said compositions exhibit a good adhesion to the substrate as well as a high intercoat adhesion and blistering stability under humidity conditions without negatively influencing the excellent sandability and the good stone chipping properties.

STATE OF THE ART

In the area of automotive refinish, repairing a defect in the original coating can involve sanding or grinding out the defect by mechanical means, or completely stripping the whole part or vehicle of its original coating layers. This sanding or grinding process typically results in the exposure of bare metal. Prior to the application of final top-coat materials, the use of separate undercoating systems is generally recommended. The sanded area of exposed bare metal is first covered with a corrosion inhibitive primer, that is, a primer formulated with corrosion inhibitive pigments and which also has adhesion to both bare metal and organic coatings. The next step involves the application of what is referred to, in the art, as a sandable primer-surfacer. Finally, a base coat/clearcoat system or a topcoat is applied to complete the repair.

Aqueous primers and primer-surfacers for coating objects are gaining in importance because environmental protection conditions are becoming increasingly stringent. Their properties must be comparable with conventional systems, i.e. ones which contain solvents. Of the cold-curing coating compositions, water-dilutable epoxy resin systems which are cured using amine containing curing agents have increasingly gained in importance. These two-component (2K) systems have excellent properties, such as good drying and good adhesion to most substrates and good corrosion protection of metals.

In order to accelerate the curing time of these systems and thus the efficiency of the refinishing process, it is known to add curing catalysts, for example tertiary amines, Lewis type acids such as $BF_3$, or weak proton donors such as phenols and carboxylic acids to these systems. One commonly used curing catalyst for epoxy-amine systems is a phenol comprising tree tertiary amine groups (i.e. tris-2,4,6-dimethyl-aminomethyl phenol) supplied under the tradename Ancamine K54. The use of this catalyst in aqueous epoxy-amine systems, however, can result in a reduced intercoat adhesion as well as an increased blistering under humidity conditions of coating layers prepared from said systems.

Further compounds known to accelerate the reaction between the epoxy resin and the amine-functional curing agent are aromatic carboxylic acids like benzoic acid and salicylic acid. An aqueous amine-epoxy resin system containing salicylic acid is disclosed, for example, in WO 2009/016162 A1. Said system contains an epoxy resin A as well as a water-soluble or water-dispersible amine-functional curing agent B which comprises the reaction product of an amine B1 having at least one primary and/or at least one secondary amino group, an adduct B2 of a polyalkylene ether polyol B21 and an epoxide component B22, and an aromatic compound B3 preferably being salicylic acid. The use of this epoxy resin system results in improved corrosion resistance. However, the coating layers obtained from this system also exhibit a reduced intercoat adhesion and blistering stability under humidity conditions as well as a reduced stone chipping resistance Sufficient intercoat adhesion and high blistering stability under humidity conditions as well as a sufficient stone chipping resistance, however, is of high importance in the refinishing procedure in order to guarantee a constant esthetically high-quality appearance of the painted surface under conditions encountered during the ordinary use of the repainted vehicle.

There is therefore a need for aqueous coating compositions, in particular in vehicle refinishing, which exhibit fast curing times at low curing temperatures, preferably curing temperatures of 80° C. or lower. Cured coatings prepared from said compositions should exhibit good adhesion to the substrate, good intercoat adhesion as well as a high blistering stability, especially under humidity conditions. Moreover, the cured coatings should exhibit an excellent corrosion resistance and sandability as well as a sufficient stone chipping resistance. Finally, the cured coatings should result in a high-quality appearance when combined with further coating layers, for example colored basecoat and/or clearcoat layers.

Object

Accordingly, the object of the present invention is to provide aqueous coating compositions which can be cured rapidly at low curing temperatures, preferably temperatures of 80° C. or lower and which result in cured coating layers having a good adhesion to the substrate, a good intercoat adhesion and high blistering stability, especially under humidity conditions without negatively influencing the excellent sandability, corrosion resistance and stone chipping resistance of said coating layers. Moreover, application of further coating layers, for example colored basecoat and/or clearcoat layers should result in a high-quality appearance multilayer coatings.

Technical Solution

The objects described above are achieved by the subject matter claimed in the claims and also by the preferred embodiments of that subject matter that are described in the description hereinafter.

A first subject of the present invention is therefore an aqueous coating composition comprising:

a) at least one aqueous dispersion (A) of an epoxy resin (ER1), said epoxy resin (ER) having—on average—at least one epoxy group per molecule, b) at least one aqueous resin dispersion (B) comprising at least one di- and/or polyfunctional monomeric primary and/or secondary amine (A1) in a proportion by weight of 0.5 to 5% and a resin component (RC) having an NH equivalent of 150 to 400 g/mol and c) at least one aromatic compound (C) having at least one carboxylic acid group, wherein the resin component (RC) comprises at least one polyfunctional organic amine (A2) having primary and/or secondary amino groups, said at least one polyfunctional organic amine (A2) containing the reaction product of:

(i) at least one di- and/or multifunctional epoxy resin (ER2) having an average epoxy equivalent weight of less than 400 g/mol, (ii) at least one di- and/or polyfunctional monomeric primary amine (A1), and (iii) at least one compound X—R where X is a functional group reactive towards epoxy groups and R is an organic radical containing at least one polyoxyalkylene unit and not containing further X groups.

The above-specified coating composition is hereinafter also referred to as coating composition of the invention and accordingly is a subject of the present invention. Preferred embodiments of the coating composition of the invention are apparent from the description hereinafter and also from the dependent claims.

In light of the prior art it was surprising and unforeseeable for the skilled worker that the object on which the invention is based could be achieved by using an aromatic carboxylic acid as curing catalyst in combination with a specific aqueous dispersion (B) as crosslinking agent in aqueous epoxy-based coating systems. These systems show rapid curing times at low temperatures, preferably at 80° C. or lower, and are therefore highly suitable for automotive refinishing. Cured coating layers obtained from said systems have excellent adhesion to the substrate as well as excellent intercoat adhesion and blistering stability under humidity conditions without negatively influencing the excellent sandability and the good stone chipping properties. Moreover, the aforementioned combination of curing catalyst and aqueous dispersion (B) allows to significantly improve the cross-cut adhesion and blistering stability under humidity conditions as compared to aqueous epoxy systems containing a different amino-functional curing agent or aqueous epoxy systems containing aqueous dispersion (B) and curing catalyst Ancamine K54.

A further subject of the present invention is a kit-of-parts, comprising two separate components A) and B):

A) at least one aqueous base varnish containing at least one aqueous dispersion (A) of an epoxy resin (ER1), said epoxy resin (ER) having—on average—at least one epoxy group per molecule; and B) at least one aqueous hardener component containing at least one aqueous resin dispersion (B) comprising at least one di- and/or polyfunctional monomeric primary and/or secondary amine (A1) in a proportion by weight of 0.5 to 5% and a resin component (RC) having an NH equivalent of 150 to 400 g/mol, the resin component (RC) comprising at least one polyfunctional organic amine (A2) having primary and/or secondary amino groups, said at least one polyfunctional organic amine (A2) containing the reaction product of:

(i) at least one di- and/or multifunctional epoxy resin (ER2) having an average epoxy equivalent weight of less than 400 g/mol, (ii) at least one di- and/or polyfunctional monomeric primary and/or secondary amine (A1), and (iii) at least one compound X—R where X is a functional group reactive towards epoxy groups and R is an organic radical containing at least one polyoxyalkylene unit and not containing further X groups; and at least one aromatic compound (C) having at least one carboxylic acid group.

Another subject of the present invention is a process for producing at least one coating layer on a substrate, said process comprising the following steps:

(i) applying an inventive aqueous coating composition or a coating composition prepared from the inventive kit-of-parts to the substrate;

(ii) forming a coating film from the coating composition applied in step (i);

(iii) curing the coating film formed in step (ii);

(iv) optionally sanding the cured coating layer obtained in step (iii); and (v) optionally applying at least one further coating layer and curing said coating layer.

A final subject of the present invention is a coated substrate produced by an inventive process.

DETAILED DESCRIPTION

The measurement methods to be employed in the context of the present invention for determining certain characteristic variables can be found in the Examples section. Unless explicitly indicated otherwise, these measurement methods are to be employed for determining the respective characteristic variable. Where reference is made in the context of the present invention to an official standard without any indication of the official period of validity, the reference is implicitly to that version of the standard that is valid on the filing date, or, in the absence of any valid version at that point in time, to the last valid version.

All film thicknesses reported in the context of the present invention should be understood as dry film thicknesses. It is therefore the thickness of the cured film in each case. Hence, where it is reported that a coating material is applied at a particular film thickness, this means that the coating material is applied in such a way as to result in the stated film thickness after curing.

All temperatures elucidated in the context of the present invention should be understood as the temperature of the room in which the substrate or the coated substrate is located. It does not mean, therefore, that the substrate itself is required to have the temperature in question.

The term "resin or resin component" is understood to mean a product that contains organic constituents, namely organic reaction products, oligomers and/or polymers, and if appropriate, like the resin component (RC), monomers as well. Resins have a more or less broad distribution of molar masses and are generally usable as binders in coating compositions. They thus form at least a proportion of the polymeric network of a coating layer present after curing.

The term "binder" or "binder constituent" refers herein, in accordance with the relevant DIN EN ISO 4618:2007-03, to the nonvolatile fraction of a coating material, excluding pigments and fillers. Specific binder constituents in this context are, as well as the epoxy resin (ER1) or else coatings additives. For the sake of clarity, however, the term "binder" is used primarily in relation to the components that are responsible for film formation and does not encompass curing or crosslinking agents.

Inventive Aqueous Coating Composition:

The inventive coating composition is an aqueous coating composition. The term "aqueous" in connection with coating compositions is known in principle. What is meant is a coating composition containing a significant proportion of water as solvent. It will be appreciated that it is alternatively possible for aqueous systems to contain organic solvents in at least minor amounts, for example as cosolvents with an emulsifier function for stabilization of particular constituents such as resins, pigments or additives. "Aqueous" in the context of the present invention should preferably be understood to mean that the composition in question has a proportion of at least 40% by weight, preferably at least 50% by weight, even more preferably at least 60% by weight, of water, based in each case on the total amount of the solvents present (i.e. water and organic solvents). Preferably in turn, the proportion of water is 50% to 99% by weight, especially 60% to 98% by weight, based in each case on the total amount of the solvents present.

The afore-mentioned definition of "aqueous" also applies with respect to the aqueous dispersions (A) and (B) described hereinafter, i.e. said dispersions have a proportion of water of 50% to 99% by weight, especially 60% to 98% by weight, based in each case on the total amount of the solvents present.

Aqueous Dispersion (A) of an Epoxy Resin (ER1):

The first mandatory component of the inventive aqueous coating composition is an aqueous dispersion (A) of an epoxy resin (ER1). The term "aqueous dispersion" is well known to the person skilled in the art and is preferably understood to mean a dispersion comprising at last 40% by weight, based on the total amount of solvents present in the dispersion, of water.

Epoxy resins are known to be polycondensation resins containing—on average—more than one epoxy group. Said resins can, for example, be prepared by condensation of bisphenol A or bisphenol F with epichlorohydrin and have—on average—2 epoxy groups. These compounds contain hydroxyl groups along the chain and epoxy groups at the ends. The crosslinking capacity via the epoxy groups is depending on the chain length since said crosslinking capacity decreases with rising chain length/molar mass.

Suitable the epoxy resins (ER1) are selected from glycidyl ethers of dihydric alcohols or phenols, novolaks, diglycidyl esters of carboxylic acids or mixtures thereof, preferably glycidyl ethers of phenols, more preferably glycidyl ethers of bisphenol A. Preferred epoxy resins (ER1) do therefore not contain any bisphenol F because the presence of bisphenol F in said epoxy resin (ER1) can have a negative influence on the sandability of the cured coating layer produced from the inventive coating compositions.

Preferably, the at least one epoxy resin (ER1) has a particular epoxy equivalent weight (EEW) and viscosity. According to a first embodiment, the epoxy resin (ER1) preferably has an epoxy equivalent weight (EEW) of 100 to 400 g/eq, more preferably 120 to 300 g/eq, even more preferably 150 to 250 g/eq, very preferably 185 to 210 g/eq, as determined according to ASTM D1652-11 (2019).

Moreover, the epoxy resin (ER1) of this first embodiment preferably has a viscosity at 25° C. of 1,000 to 20,000 mPa*s, more preferably 1,500 to 15,000 mPa*s, very preferably 2,500 to 9,500 mPa*s, as determined according to ASTM D2196-18.

According to an alternative embodiment, the epoxy resin (ER1) preferably has an epoxy equivalent weight (EEW) of 250 to 700 g/eq, more preferably 300 to 600 g/eq, even more preferably 350 to 550 g/eq, very preferably 380 to 520 g/eq, as determined according to VLN 305.

Moreover, the epoxy resin (ER1) of this alternative embodiment preferably has a dynamic viscosity at 23° C. at 100 $s^{-1}$ of 100 to 3,000 mPa*s, more preferably 150 to 2,500 mPa*s, even more preferably 200 to 2,000 mPa*s, very preferably 250 to 1,400 mPa*s, as determined according to DIN EN ISO 3219:1994-10.

Use of the afore-stated epoxy resins (ER1) results in good optical and mechanical properties, as well as a high adhesion of coating layers prepared from the inventive coating compositions. Moreover, said epoxy resins (ER1) allow a stable dispersion of pigments and/or fillers without irreversible thickening or solidification during dispersion.

The at least one dispersion (A) of the epoxy resin (ER1) is preferably present in a total amount of 5 to 50% by weight, more preferably 10 to 40% by weight, even more preferably 15 to 30% by weight, very preferably 18 to 25% by weight, based in each case on the total weight of the aqueous coating composition.

Suitable total amounts of epoxy resin (ER1) in the aqueous coating composition range from 1 to 30% by weight, preferably 5 to 25% by weight, more preferably 8 to 20% by weight, very preferably 10 to 15% by weight, based in each case on the total weight of the aqueous coating composition.

Aqueous Dispersion (B):

The second mandatory component of the inventive aqueous coating composition is an aqueous dispersion (B) containing at least one di- and/or polyfunctional monomeric primary and/or secondary amine (A1) in a proportion by weight of 0.5 to 5% and a resin component (RC) having an NH equivalent of 150 to 400 g/mol.

Di- and/or Polyfunctional Monomeric Primary and/or Secondary Amine (A1):

Di- and/or polyfunctional monomeric primary and/or secondary amines (A1) are understood to mean low molecular weight compounds, i.e. compounds with a molecular weight of less than 500 g/mol, preferably less than 250 g/mol, having a discrete number of amino groups per molecule which is constant for each molecule.

The at least one di- and/or polyfunctional monomeric primary and/or secondary amine (A1) preferably consists of at least 65 mol-%, preferably at least 75 mol-%, more preferably at least 90 mol-%, very preferably 100 mol-% of amines consisting of amino groups and hydrocarbon radicals. Thus, other functional groups, for example hydroxyl, carboxyl or nitrile groups, are only present in minor amounts or not present at all. The low amount of other functional groups, preferably the absence of other functional groups, results in improved sandability of cured coating layers obtained from inventive coating compositions.

The proportion of corresponding amines (A1) is based on the total amount of the aqueous dispersion (B) and is determined by the amount of amine (A1) being introduced into the dispersion (B) during its preparation. In case commercial products are used, the proportion of said amines (A1) can be determined by commonly known analysis methods, for example via gas chromatography (GC) or mass spectrometry (MS)).

Examples of suitable amines (A1) are the monomeric aliphatic amines, aromatic amines and araliphatic (mixed aliphatic-aromatic) amines that are known in principle to the person skilled in the art. Examples of such amines include ethylenediamine, propylene-1,2-diamine, propylene-1,3-diamine, butane-1,4-diamine, octane-1,8-diamine, 1,3-diaminopentane, hexamethylenediamine, 2-methylpentamethylenediamine, neopentanediamine, cyclohexanediamine, 2,2,4-(2,4,4-)trimethylhexamethylenediamine, 35 isophoronediamine, bis(aminomethyl)cyclohexane, bis(4-aminocyclohexyl)methane, diethylenetriamine, triethylenetetramine, tetraethylenepentamine, dipropylenetriamine, bis(hexamethylenediamine), N,N-5 dimethylaminodipropylenetriamine, laurylpropylenediamine, 1,2- and 1,3-(m)-xylylenediamine and 1,4-bis(aminomethyl)benzene. Further amines include aminoethylethanolamine or else heterocyclic polyamines such as aminoethylpiperazine and bis(aminopropyl)piperazine.

Preference is given to difunctional monomeric primary and/or secondary amines. Particular preference is given to difunctional monomeric primary amines, very preferably to isophorone diamine and/or m-xylylenediamine. With particular preference, the aqueous dispersion (B) contains at least two difunctional monomeric primary amines, namely isophorone diamine and m-xylylenediamine.

The proportion of the at least one di- and/or polyfunctional monomeric primary and/or secondary amine (A1) in the aqueous dispersion (B), preferably isophorone diamine and/or m-xylylenediamine, is from 1 to 4.5% by weight, preferably 1.5 to 4% by weight, based on the total weight of the aqueous dispersion (B).

Resin Component (RC):

The resin component (RC) comprises at least one polyfunctional organic amine (A2) having primary and/or secondary amino groups. By delimitation from the monomeric amines (A1) already described, these are adducts or reaction products having a polymeric character and a number of amino groups per molecule which can be described solely by way of averages.

The resin component (RC) preferably has an NH equivalent of 160 to 350 g/mol, preferably 170 to 250 g/mol (for method of determination see examples section)

The at least one polyfunctional organic amine (A2) contains the reaction product of:

(i) at least one di- and/or multifunctional epoxy resin (ER2) having an average epoxy equivalent weight of less than 400 g/mol, (ii) at least one di- and/or polyfunctional monomeric primary and/or secondary amine (A3), and (iii) at least one compound X—R where X is a functional group reactive towards epoxy groups and R is an organic radical containing at least one polyoxyalkylene unit and not containing further X groups.

It is preferred within the present invention if the resin component (RC) further contains—apart from the polyfunctional organic amine (A2)—at least one polyfunctional organic amine (A3) having primary and/or secondary amino groups, said polyfunctional organic amine (A3) being the reaction product of:

(i) at least one di- and/or multifunctional epoxy resin (ER2) having an average epoxy equivalent weight of less than 400 g/mol, and (ii) at least one di- and/or polyfunctional monomeric primary and/or secondary amine (A1).

The polyfunctional organic amine (A3) thus differs from the polyfunctional amine (A2) since different starting materials are used to prepare said polyfunctional organic amines. The term "reaction product" in the sense of the present invention is understood to mean compounds which are obtained by reacting the listed compounds with each other. This already implies that said reaction products cannot comprise further constituents, not explicitly listed in connection with said reaction products.

With particular preference, the resin component (RC) consists of the at least one polyfunctional organic amine (A2) having primary and/or secondary amino groups and the at least one polyfunctional organic amine (A3) having primary and/or secondary amino groups.

The at least one di- and/or multifunctional epoxy resin (ER2) used to prepare the polyfunctional organic amine (A2) and the polyfunctional amine (A3) has an average epoxy equivalent (EEW) of less than 400 g/eq. It has been found that a correspondingly low average epoxy equivalent weight and hence a higher epoxy functionality of this component leads to better sandability again in the surfacer layer to be ultimately produced. More preferably, the average epoxy equivalent weight is less than 350 g/mol, preferably less 30 than 300 g/mol, more preferably less than 250 g/mol, very preferably 160 to 200 g/mol, as determined according to DIN EN ISO 3001:2019-08. The average epoxy equivalent can be obtained via the determination of the epoxy equivalent of all epoxy compounds used and weighting of the proportions by mass thereof in the total weight of the epoxy compounds. In case of commercial products (in which the epoxy compounds may already be covalently bonded), the average epoxy equivalent weight can be determined by analysis of the products, for example, via gas chromatography (GC) or mass spectrometry (MS)).

It is preferably that the at least one di- and/or multifunctional epoxy resin (ER2) has—on average—1 to 5 epoxy functions, preferably 1 to 4 epoxy functions, more preferably 1 to 3 epoxy functions, very preferably 2 epoxy functions, since said epoxy resins are readily commercially available.

Suitable epoxy resins (ER2) can be saturated or unsaturated, aliphatic and mixed aliphatic-aromatic compounds optionally comprising hydroxyl groups, for example selected from glycidyl ethers of dihydric alcohols or phenols, novolaks, diglycidyl esters of carboxylic acids or mixtures thereof. Among the phenols, resorcinol, hydro quinone, 2,2-bis-(4-hydroxyphenyl)-propane (bisphenol A), mixtures of isomers of dihydroxydiphenylmethane (bisphenol F), tetrabromo bisphenol A, 4,4'-dihydroxydiphenyl cyclohexane, 2,2-bis-(4-hydroxy-3-methylphenyl)-propane, 4,4'-dihydroxydiphenyl, 4,4'-dihydroxybenzophenone, 1,1-bis-(4-hydroxyphenyl)-ethane, 2,2-bis-[4-(2'-hydroxy-propoxy)-phenyl]-propane, 1,1-bis-(4-hydroxyphenyl)-isobutane, 2,2-bis(4-hydroxy-3-tert.-butylphenyl)-propane, bis-(2-hydroxynaphthyl)-methane, 1,5-dihydroxy naphthalene, tris-(4-hydroxyphenyl)-methane, bis-(4-hydroxyphenyl)ether, bis-(4-hydroxyphenyl)sulphone, as well as products of halogenation and hydration of the compounds mentioned. It is also possible to use diepoxy alkanes made by epoxidation of diolefins.

Particularly preferred epoxy resins (ER2) are glycidyl ethers of phenols, very preferably glycidyl ethers of bisphenol A. Thus, particularly preferred the epoxy resins (ER2) do not contain any bisphenol F. It has been found that the absence of bisphenol F in the epoxy resin (ER2) results in an increased sandability of the cured coating layer produced from inventive coating compositions.

The at least one di- and/or polyfunctional monomeric primary and/or secondary amine (A1) used to prepare the polyfunctional organic amine (A2) and the polyfunctional amine (A3) is corresponding to amine (A1) previously described in connection with the aqueous dispersion (B).

In the preparation of the polyfunctional organic amine (A2), at least one specific compound X—R is used. Preference is given to using exactly one compound X—R.

The X groups are the groups known to those skilled in the art, for example primary or secondary amino groups, hydroxyl groups, carboxylic acid groups or thiol groups. It is crucial that the compound X—R has just one X group. Otherwise, an adverse effect is found on the sandability of the cured coating layer obtained from the inventive coating composition. Preferred X groups are amino groups, and among those preferably primary amino groups. Aside from the good reactivity of amino groups with epoxy groups, the primary amine has two N—H equivalents and hence linkage sites to epoxides. In this way, incorporation of the compound X—R into a side chain position of the polyfunctional organic amine (A2) can occur. The presence of amino groups, preferably primary amine groups, results in improved sandability of the cured coating layer obtained from the inventive coating composition.

The R group is an organic radical containing polyoxyalkylene units, especially preferably polyethylene or polypropylene units or mixed polyethylene/polypropylene units.

It is preferable that the organic R radical, apart from any molecular units resulting from the synthesis, consists of polyoxyalkylene units. For the sake of simplicity, such R groups are also referred to as polyoxyalkylene groups. Molecular units that result from the synthesis are, for example, organic radicals of molecules that are used at the start of the formation of a polyoxyalkylene chain, for example a starter alcohol by means of which the polymerization of ethylene oxide and/or propylene oxide is initiated.

Particularly preferred compounds X—R are selected from primary polyoxyalkylene monoamines. Said compounds can be synthesized or obtained commercially, for example under the tradename "Jeffamine" from Huntsman Corporation.

The weight-average molecular weight of the compound X—R may vary widely and is, for example, in the range from 800 to 2,200 g/mol (determined by means of coupling of size exclusion chromatography with light scattering).

With particular preference, the least one polyfunctional organic amine (A2) having primary and/or secondary amino groups consists of the reaction product of components (i), (ii) and (iii). Thus, the polyfunctional organic amine (A2) does not comprise any further compounds, apart from the aforestated reaction product.

The dispersion (B) preferably has a solids content of 25 to 45% by weight, based on the total weight of dispersion and determined according to DIN EN ISO 3251:2018-07.

The aqueous dispersion (B) comprising at least one di- and/or polyfunctional monomeric primary and/or secondary amine (A1) and a resin component (RC) is preparable, for example, by a two-step process, which will be described in detail hereinafter.

Step (1):

In the first step (1), an amino-functional resin mixture (I) is prepared by reacting an epoxy-functional resin mixture (Ia) with a component (Ib) containing at least one di- and/or multifunctional monomeric primary and/or secondary amine (A1).

The epoxy-functional resin mixture (Ia) is prepared by reacting at least one di- and/or multifunctional epoxy resin (ER2) having an average epoxy equivalent weight of less than 400 g/mol with at last one compound X—R. For this purpose the epoxy groups of epoxy resin (ER2) are used in a molar stochiometric excess relative to the reactive units X of compound X—R. The number of reactive units X means the number of potential linkage sites in compound X—R for each epoxy group. For a hydroxyl group or secondary amino group, there is, for example, one reactive unit per X group. For primary amino groups, there are two reactive units (two N—H functions). Preferably, the molar ratio of the epoxy groups of epoxy resin (ER2) to the epoxy-reactive units of the X groups of component X—R is from 10 to 1.1, more preferably 5 to 1.5, especially preferably from 3.5 to 1.8. The amount of epoxy groups in the epoxy resin (ER2) can be obtained or adjusted appropriately by determination of the epoxy equivalent weight. The amount of reactive units in the X groups can be determined, for example, by the determination of the amine number, the OH number or acid number (DIN 53176:2002-11, DIN 53240-3:2016-03, DIN EN ISO 2114 Correction 1: 2006-11).

The epoxy functional resin mixture (Ia) preferably has an epoxy equivalent weight of 500 to 1,500 g/mol, more preferably 600 to 1,200 g/mol.

Component (Ib) which is reacted with the epoxy functional resin mixture (Ia) comprises at least one di- and/or multifunctional monomeric primary and/or secondary amine (A1). Preferably, component (Ib) consists of at least one such amine (A1).

Examples of suitable epoxy resins (ER2), compounds X—R and amines (A1) have already been described above and are correspondingly applicable.

The resin mixture (I) is an amino-functional resin mixture. Thus, a molar excess of the NH-equivalents of compound (Ib) relative to the epoxy functional resin mixture (Ia) has to be used. Specifically, the NH equivalent of the resin mixture (I) is from 50 to 140 g/mol, preferably 70 to 130 g/mol (for method of determination see examples section). Moreover, the resin mixture (I) comprises a proportion of 17.5% to 40% by weight, preferably 25% to 35% by weight, of di- and/or polyfunctional monomeric primary and/or secondary amines (A1), i.e. component (Ib). Both criteria can be adjusted by the person skilled in the art by suitable choice of the molar amounts of the two components and in the knowledge that there is quantitative conversion of epoxy groups and N—H functions under the conditions and reaction regimes that are known per se. Preferably, the resin mixture (I), after its production, is in dispersion in water and in that case is in aqueous dispersion.

The resin mixture (I) can as such be produced as described above and hence obtained in aqueous dispersion. It is likewise possible to commercially purchase an aqueous dispersion of a resin mixture (I) (for example as Beckopox VEH 2849w/80WA (from Allnex)).

Step (2):

The aqueous dispersion (B) is obtained in the second step (2) by reacting a component (IIa) containing the amino-functional resin mixture (I) with a component (IIb) containing at least one di- and/or multifunctional organic epoxy resin (ER2) having an average epoxy equivalent weight of less than 400 g/mol, preferably less than 350 g/mol, more preferably less than 250 g/mol. If desired, organic solvents used during the preparation of the aqueous dispersion (B) can be removed. Since the resin component (RC) is amine-functional, a molar excess of the NH-equivalents of component (IIa) to the epoxy groups of component (IIb) is used.

Preference is given to using, as component (IIa), the direct reaction product from step (1), since the resin mixture (I) is obtained as an aqueous dispersion after step (1) and can thus be used directly in step (2) which takes place in the aqueous phase. Prior to performing step (2), solvents or additives, such as emulsifiers, can be added to said reaction product.

Component (IIa) preferably does not contain—apart from the amino-functional resin mixture (I)—any further compounds that can react with component (IIb).

Component (IIb) preferably consists of at least one, preferably exactly one, di- and/or multifunctional organic epoxy resin (ER2) having an epoxy equivalent weight that meets the abovementioned prerequisites. Examples of suitable epoxy compounds are those already described above as component.

The above-described process also permits, for example, the utilization of existing commercial products (for example the above-described Beckopox VEH 2849w/80WA). Thus, the aqueous dispersion (B) can be easily obtained by simple modification of a commercial product with an appropriate epoxide (since, apart from this last reaction, all further reaction processes have already been implemented in the production of the commercial product).

However, the aqueous dispersion (B) can also be obtained by a one-step process in which all starting materials are reacted together by adjusting the stoichiometries of amines and epoxides. It would also be possible first to react the epoxy resin (ER2) with compound X—R, and further react the obtained product with further epoxides and monomeric amines (A1).

The resin component (RC) is preferably present in a total amount of 10 to 30% by weight, preferably 15 to 25% by weight, based in each case on the solids content of the aqueous coating composition.

Aromatic Compound (C) Having at Least One Carboxylic Acid Group:

The third mandatory component of the inventive aqueous coating composition is an aromatic compound (C) having at least one carboxylic acid group. Aromatic compounds denote compounds having at least one aromatic moiety in the molecule. The carboxylic acid group can either be attached directly or via a linker to the aromatic moiety. Preferably, the carboxylic acid group is attached directly to the aromatic moiety.

Preferred compounds (C) further comprises at least one hydroxy group. The presence of the at least one hydroxyl group has been found to improve the acceleration of the crosslinking reaction compared to aromatic compounds not having any hydroxyl groups.

Particularly preferred are resorcinol, salicylic acid, p-hydroxybenzoic acid, 2,4-dihydroxybenzoic acid (beta-resorcylic acid), 2,5-dihydroxybenzoic acid (gentisic acid), 2,6-dihydroxybenzoic acid (gamma-resorcylic acid), 3,4-dihydroxybenzoic acid (protocatechuic acid), 3,5-dihydroxybenzoic acid (alpha-resorcylic acid), 3,4,5-trihydroxybenzoic acid (gallic acid), 2-hydroxy-3-naphthoic acid, 2-hydroxy naphthoic acid and alkyl derivatives of these such as 2-hydroxy-3-, -4-, and -5-methyl-benzoic acid (cresotic acids) and mixtures thereof. With particular preference, salicylic acid is used as compound (C).

The at least one aromatic compound (C) is preferably present in a total amount of 0.1 to 5% by weight, more preferably 0.2 to 3% by weight, even more preferably 0.3 to 1% by weight, very preferably 0.4 to 0.7% by weight, based in each case on the total weight of the aqueous coating composition.

Further Optional Ingredients of the Aqueous Coating Composition:

The inventive aqueous coating composition preferably comprises at least one pigment and/or filler, i.e. the inventive aqueous coating composition preferably results in colored coating layers. Preferred pigments are black and/or white pigments. The coating composition thus preferably contains at least one black pigment or at least one white pigment or at least one white pigment and one black pigment. This means that the coating composition of the invention preferably has a black, white or (in various gradations) gray color. The composition can also contain further pigments.

Preferred black pigments are the typical organic and inorganic, especially inorganic, black pigments as commercially available in powder form. Particular mention should be made of pigment blacks (carbon blacks), iron oxide ($Fe_3O_4$) pigments such as the typical synthetic iron oxides (available, for example, under the Bayferrox trade name from Lanxess), mixed oxide pigments such as manganese black or spinel black. Very particular preference is given to pigment blacks (carbon blacks) and iron oxide pigments.

Preferred white pigments are the typical inorganic white pigments, for example titanium dioxide (for example the rutile pigments known by the Kronos trade name from Kronos), zinc 15 oxide, zinc sulfide or antimony trioxide. Very particular preference is given to titanium dioxide, especially in its rutile modification.

Further preferred pigments are the pigments known to the person skilled in the art as "anticorrosion pigments". Particular preference is given here to zinc phosphate. Even though zinc phosphate has a white color, it is not classified as a white pigment but as an anticorrosion pigment owing to its anticorrosive effect.

The proportion of the pigments is preferably 15 to 25% by weight, very preferably 20% by weight, based in each case on the solids content of the coating composition.

Fillers present with preference are all inorganic and organic fillers that are known per se and familiar to the person skilled in the art, preferably inorganic fillers. The fillers thus especially include the substances known to those skilled in the art that are used, for example, in granular form or in powder form for attainment of particular physical properties of coating compositions and are insoluble in the respective use medium. These especially include 30 carbonates such as calcium carbonate or barium carbonate, sulfates such as calcium sulfate and barium sulfate, silicates and sheet silicates such as talc, pyrophyllite, mica, kaolin, precipitated calcium silicates, aluminum silicates, calcium/aluminum silicates, sodium/aluminum silicates and mullite, silicas such as quartz, cristobalite, precipitated silicas or especially fumed silicas as obtainable, for example, under the Aerosil trade name (from Evonik), metal oxides and hydroxides, for example aluminum hydroxide and magnesium hydroxide.

The proportion of the fillers is preferably 30 to 50% by weight, especially 30 to 40% by weight, based in each case on the solids content of the coating composition.

In addition, the coating composition may also contain at least one additive. Examples of such additives are light stabilizers, antioxidants, deaerating agents, emulsifiers, slip additives, polymerization inhibitors, adhesion promoters, leveling agents, film-forming auxiliaries, thickeners, sag control agents (SCAs) or corrosion inhibitors. They are used in the customary and known amounts. The same applies to the possible use of organic solvents, which are used in such amounts that they do not alter the aqueous character of the coating composition.

Properties of the Aqueous Coating Composition

In order to ensure rapid and complete crosslinking under curing conditions, the aqueous coating composition preferably contains a specific molar ratio of the NH groups of the resin compound (RC) to the epoxy groups of the epoxy resin (ER1). It is therefore preferred, if the molar ratio of NH groups of the resin compound (RC) to the epoxy groups of the epoxy resin (ER1) is from 0.74:1 to 0.95:1, preferably 0.9:1.

The solids content of the 2K coating composition may vary according to the requirements of the individual case, but is preferably in the range of 70 to 85% by weight, based on the total weight of aqueous coating composition and determined according to DIN EN ISO 3251:2018-07. The solids content is guided primarily by the viscosity required for application, more particularly for spray application, and so may be adjusted by the skilled person on the basis of his or her general art knowledge, optionally with assistance from a few exploratory tests.

The coating composition can be produced using the mixing methods and mixing units that are customary and known for the production of coating compositions, such as stirred tanks, stirred mills, pearl mills, extruders, kneaders, Ultraturrax, in-line dissolvers, static mixers, toothed ring dispersers, expansion nozzles and/or microfluidizers.

The inventive coating composition is of excellent suitability as surfacer and/or primer-surfacer. Accordingly, the coating composition of the invention is preferably a surfacer or primer-surfacer. The function, configuration and field of use of surfacers and primer-surfacers are known in principle to the person skilled in the art and in that respect have delimiting character. A surfacer is generally applied in the context of automotive OEM finishing as an interlayer (to the previously cured electrocoat), cured separately and then overcoated with basecoat and clearcoat. Primer-surfacers find use especially in the automotive refinishing sector, where they are responsible for filling locally damaged areas in the original paint system and for obtaining appropriate adhesion on the substrate and assurance of corrosion protection.

Inventive Kit-of-Parts:

In order to prevent reaction of the epoxy resin (ER1) with the components of the aqueous dispersion (B), the inventive coating composition is preferably formulated as a multiple component, more preferably two-component, coating composition. In a multiple component composition, the compounds of the coating composition are contained in separate containers and the coating composition is prepared by mixing the contents of the containers, preferably shortly before application of the prepared coating composition to the substrate.

The present invention therefore also relates to kit-of-parts, comprising two separate components A) and B):

A) at least one aqueous base varnish containing at least one aqueous dispersion (A) of an epoxy resin (ER1), said epoxy resin (ER) having—on average—at least one epoxy group per molecule; and B) at least one aqueous hardener component containing at least one aqueous resin dispersion (B) comprising at least one di- and/or polyfunctional monomeric primary and/or secondary amine (A1) in a proportion by weight of 0.5 to 5% and a resin component (RC) having an NH equivalent of 150 to 400 g/mol, the resin component (RC) comprising at least one polyfunctional organic amine (A2) having primary and/or secondary amino groups, said at least one polyfunctional organic amine (A2) containing the reaction product of:

(i) at least one di- and/or multifunctional epoxy resin (ER2) having an average epoxy equivalent weight of less than 400 g/mol, (ii) at least one di- and/or polyfunctional monomeric primary and/or secondary amine (A1), and (iii) at least one compound X—R where X is a functional group reactive towards epoxy groups and R is an organic radical containing at least one polyoxyalkylene unit and not containing further X groups; and at least one aromatic compound (C) having at least one carboxylic acid group.

The inventive kit-of-parts therefore comprises at least two components A) and B), preferably it consists of exactly these two components A) and B). It is also possible within the present invention that further compounds, such as solvents or additives, can be present as a separate component and can be used to adjust the viscosity of the coating composition obtained after mixing components A) and B).

In said inventive kit-of-parts, the base varnish (component A)) and the hardener component (component B)) as defined below are prepared and stored separately from one another and are mixed with each other only shortly before application to the substrate. The processing time or pot life (i.e. the time within which the coating composition obtained by mixing components A) and B) can be processed and applied at room temperature (15 to 25° C., especially 20° C.)) is dependent on the compounds present in the base varnish and the hardener component. In the context of the present invention, the processing time of the coating composition obtained by mixing components A) and B) is preferably at least 2 min up to 60 min, more preferably at least 5 min up to 60 min. The particular advantage of such a two-component coating composition is that curing can be effected at temperatures below 100° C., thus rendering said two-component compositions suitable in refinish applications.

It is likewise known that the base varnish A) regularly contains, apart from the epoxy resin (ER1) used as binder and solvents, all or the vast majority of further functional constituents of the composition, for example pigments, fillers and additives, whereas the hardener component B), aside from solvents and any additives present, contains solely the compounds intended for crosslinking. The terms "base vanish component" and "hardener component" in connection with multicomponent coating compositions are known to the person skilled in the art and also have essence characterizing and hence delimiting character within a certain scope of configuration. It is particularly preferred in the context of the present invention if the base varnish A) contains pigments and fillers, preferably all pigments and fillers, that are used in the coating composition obtained after mixing components A) and B). It is likewise preferable that the base varnish A) comprises no other epoxy resins aside from the at least one epoxy resin (ER1), i.e. the epoxy resins (ER1) account for at least 90% by weight, preferably at least 95% by weight, of the binder component of the base varnish A). The binder component results from the solids (nonvolatile component) of the dispersion minus the proportion of pigments and fillers. The epoxy groups can react with the N—H functions of the polyamine component present in the hardener component B), after mixing of the two main components A) and B), to form network structures and in this way contribute to curing of a coating layer produced from the coating composition.

It is furthermore preferably if the base varnish A) is in the form of an aqueous dispersion.

It is known in principle that pigments and fillers are used in coating compositions in the form of a dispersion. This means that the production of the coating composition comprises a step in which pigments or fillers are dispersed with resins and generally solvents such as water with introduction of high shear forces in mills or dissolvers. The resins here have a dispersing or emulsifying effect and merely promote the stabilization of the pigments or fillers. For further assistance of dispersion, it is of course also possible to use additional additives. It is likewise possible that the production of the dispersion comprises the addition of all paint constituents to be introduced into the base varnish A), such that the base varnish A) thus ultimately consists of the dispersion. A dispersion is thus a mixture that contains at least (but not necessarily exclusively) resins and pigments and/or fillers in a mutually dispersed form.

The fact that the base varnish A) preferably contains or consists of a dispersion thus means that either a dispersion is produced as described above and then is completed with the further paint components still absent to produce the base varnish A) (for example using standard stirring equipment), or else, in the case of production of the dispersion, all constituents of the base varnish A) are introduced into the dispersion process and hence the dispersion constitutes the base varnish A). Since the dispersion is preferably aqueous, water is preferably used in the actual dispersion process.

With respect to preferred aqueous dispersions (A) comprising at least one epoxy resin (ER1), aqueous dispersion (B), compound (C), pigments and/or fillers and further additives and compounds which can be present in components A) and/or B) of the inventive kit-of-parts, reference is made to description of said components with regard to the inventive coating composition.

What has been said about the inventive coating composition applies mutatis mutandis with respect to further preferred embodiments of the inventive kit-of-parts.

Inventive Process:

The present invention further provides a process for producing a coating on a substrate, in which the coating composition of the invention is applied to a substrate, a coating film is formed and afterwards cured. The cured coating layer can be sanded and coated with further coating layers. It will be appreciated that, in the context of the process of the invention in which the coating composition is used, the above-described particular and preferred embodiments with regard to the coating composition are likewise applicable.

Step (i):

In step (i) of the inventive process, an inventive aqueous coating composition or a coating composition prepared from the inventive kit-of-parts is applied to the substrate. Application of the composition to the substrate in the sense of the present invention is not restricted to the direct application onto a metallic substrate. Instead, there may be at least one further layer between the metallic substrate and the layer formed by the composition. This is the case, for example, when the coating composition is used as surfacer in OEM finishing. This is because, in such a case, there will be at least one electrocoat layer between the surfacer layer and the metallic substrate. In other words, the substrate to which the composition of the invention is applied is thus a metal substrate coated with an electrocoat layer.

Application of the composition to the substrate can be effected by methods known in the state of the art, for example by spraying, knife-coating, painting, pouring, dipping, impregnating, trickling or rolling. Preference is given to employing spraying methods.

Substrates used are, for example, metallic substrates, preferably those as used within the automotive industry (vehicle manufacture). Advantageously, unalloyed and alloyed steels and/or iron, zinc and aluminum substrates and corresponding alloys are used. Moreover, the coating composition can also be applied to plastic substrates and substrates having metallic and plastic parts. Moreover, the composition can also be applied on old paintings, for example multilayer coatings having defective sites.

Step (ii):

After the coating composition has been applied to the substrate, a polymer film is formed therefrom. Said film formation is preferably done by drying and/or by flashing the applied composition. Drying and flash-off in the context of the present invention means evaporation of organic solvents and/or water, as a result of which the paint dries but does not yet cure, and more particularly does not yet form a fully crosslinked coating film.

Drying and/or flashing off the applied coating composition is preferably performed at 15 to 25° C. for 1 to 60 minutes.

Step (iii):

In step (iii) of the inventive process, the coating film formed in step (ii) is cured by known methods. Curing means the process known to the skilled person, in other words the conversion of a coating composition, applied as a film to a substrate, into the ready-to-use state, in other words, therefore, into a state in which the substrate provided with the coating in question can be put to its intended use. In connection with the problem that is likewise of relevance in relation to refinishing and has been addressed in the context of the present invention, namely the obtaining of good sandability, exactly that sandability and subsequent overcoatability are of course criteria for intended use. The curing is especially effected by chemical reaction of reactive functional groups of epoxide resin (ER1) and compounds of the aqueous dispersion (B). As a result of these crosslinking reactions and of the parallel evaporation of any organic solvents and/or water present, a coating film is formed—that is, a cured coating layer (cured coating) is produced. Activation of the reactions is possible by means of thermal energy, although in the case of the present invention there is the above-described advantage of high temperatures not being necessary.

The curing is effected at temperatures of, for example, 15 to 180° C., especially 20 to 80° C., most preferably of 20 to 65° C. These preferred comparatively low curing temperatures result particularly from the fact that the coating composition is preferably formulated as a (2K) coating composition, in the case of which, in particular, only low curing temperatures are needed for the thermal crosslinking. The duration of the curing may vary significantly in the individual case and is, for example, between 5 min and 16 hours, preferably 20 min to 80 min. These preferred comparatively short curing times result particularly from the fact that the composition of the invention requires only comparatively short curing times at temperatures that are nevertheless comparatively low in order nevertheless to have sufficient hardness that enables the sanding of the cured coating. A curing operation which is very particularly preferred in this respect is effected at 40 to 65° C. for 20 to 80 minutes.

Preferred layer thicknesses which result after curing in step (iii) are customary in the vehicle industry and range, for example, from 5 to 200 micrometers, preferably 10 to 150 micrometers, more preferably 30 to 80 micrometers.

Optional Step (iv):

In optional step (iv) of the inventive process, the cured coating layer obtained after step (iii) is sanded. This step is preferably performed in case further coating layers are to be applied on top of the cured coating layer formed in step (iii).

Sanding can be performed by methods commonly known in the art, for example by using appropriate sanding paper and sanding equipment.

Optional Step (v):

In optional step (v) of the inventive process, at least one further coating layer is applied and cured. Said step can be performed after step (iii) or optional step (iv), preferably after optional step (iv). The at least one further coating layer is selected from colored basecoat layers and/or clearcoat layers.

The basecoat layers and/or clearcoat layers can be obtained by application of commercially known aqueous or solvent-based basecoat and/or clearcoat compositions. In case further coating compositions are applied, a multicoat paint system is formed.

As already indicated above, the coating composition of the invention, is particularly advantageously usable as primer-surfacer in the refinishing sector, especially automotive refinishing. Accordingly, in particular embodiments of the present invention, the substrates are already fully painted metallic substrates, especially those painted with multicoat automotive paint systems, in which the respective multiple coating has local damage (defects). More particularly, these are thus automotive bodywork or parts thereof that have damage, for example stonechip damage and the like. In the damaged regions, the original multilayer coating has thus been at least partly detached by outside action. The coating composition of the invention is then used in the repair of these damaged areas, i.e. the refinishing, as primer-surfacer. In general, in the refinishing operation, the application of the primer is preceded by cleaning and sanding of the damaged originally coated substrate. This removes any only insufficiently adhering and partly detached areas of the original coating that are present and/or corrosion products that have already formed and especially also locally exposes the metallic substrate. This is thus a complex substrate surface having a wide variety of different interfaces. One interface here is that with the completely exposed metallic substrate. Further interfaces and edges can be found in the region between the damaged, cleaned and sanded sites and the areas surrounding these sites with intact original paint system. At all these interfaces, one and the same coating composition has to assure adequate adhesion. Thus, the composition of the invention offers great advantages since, even in this demanding area, excellent adhesion, corrosion resistance and sandability are nevertheless obtained.

What has been said about the inventive coating composition and the inventive kit-of-parts applies mutatis mutandis with respect to further preferred embodiments of the inventive method.

Inventive Coated Substrate:

The result after step (iii) or optional step (v) of the inventive process is a coated substrate.

What has been said about the inventive coating composition, the inventive kit-of-parts and the inventive process applies mutatis mutandis with respect to further preferred embodiments of the inventive coated substrates.

The invention is described in particular by the following embodiments:

Embodiment 1: aqueous coating composition comprising:

a) at least one aqueous dispersion (A) of an epoxy resin (ER1), said epoxy resin (ER) having—on average—at least one epoxy group per molecule, b) at least one aqueous resin dispersion (B) comprising at least one di- and/or polyfunctional monomeric primary and/or secondary amine (A1) in a proportion by weight of 0.5 to 5% and a resin component (RC) having an NH equivalent of 150 to 400 g/mol and c) at least one aromatic compound (C) having at least one carboxylic acid group, wherein the resin component (RC) comprises at least one polyfunctional organic amine (A2) having primary and/or secondary amino groups, said at least one polyfunctional organic amine (A2) containing the reaction product of:

(i) at least one di- and/or multifunctional epoxy resin (ER2) having an average epoxy equivalent weight of less than 400 g/mol, (ii) at least one di- and/or polyfunctional monomeric primary and/or secondary amine (A1), and (iii) at least one compound X—R where X is a functional group reactive towards epoxy groups and R is an organic radical containing at least one polyoxyalkylene unit and not containing further X groups.

Embodiment 2: aqueous coating composition according to embodiment 1, wherein the epoxy resin (ER1) is selected from glycidyl ethers of dihydric alcohols or phenols, novolaks, diglycidyl esters of carboxylic acids or mixtures thereof, preferably glycidyl ethers of phenols, more preferably glycidyl ethers of bisphenol A.

Embodiment 3: aqueous coating composition according to embodiment 1 or 2, wherein the epoxy resin (ER1) has an epoxy equivalent weight (EEW) of 100 to 400 g/eq, preferably 120 to 300 g/eq, more preferably 150 to 250 g/eq, very preferably 185 to 210 g/eq, as determined according to ASTM D1652-11(2019).

Embodiment 4: aqueous coating composition according to any of the preceding embodiments, wherein the epoxy resin (ER1) has a viscosity at 25° C. of 1,000 to 20,000 mPa*s, preferably 1,500 to 15,000 mPa*s, very preferably 2,500 to 9,500 mPa*s, as determined according to ASTM D2196-18.

Embodiment 5: aqueous coating composition according to embodiment 1 or 2, wherein the epoxy resin (ER1) has an epoxy equivalent weight (EEW) of 250 to 700 g/eq, preferably 300 to 600 g/eq, more preferably 350 to 550 g/eq, very preferably 380 to 520 g/eq, as determined according to VLN 305.

Embodiment 6: aqueous coating composition according to any of embodiments 1, 2 or 5, wherein the epoxy resin (ER1) has a dynamic viscosity at 23° C. at 100 s$^{-1}$ of 100 to 3,000 mPa*s, preferably 150 to 2,500 mPa*s, more preferably 200 to 2,000 mPa*s, very preferably 250 to 1,400 mPa*s, as determined according to DIN EN ISO 3219:1994-10.

Embodiment 7: aqueous coating composition according to any of the preceding embodiments, wherein the at least one dispersion (A) of the epoxy resin (ER1) is present in a total amount of 5 to 50% by weight, preferably 10 to 40% by weight, more preferably 15 to 30% by weight, very preferably 18 to 25% by weight, based in each case on the total weight of the aqueous coating composition.

Embodiment 8: aqueous coating composition according to any of the preceding embodiments, wherein the epoxy resin (ER1) is present in a total amount of 1 to 30% by weight, preferably 5 to 25% by weight, more preferably 8 to 20% by weight, very preferably 10 to 15% by weight, based in each case on the total weight of the aqueous coating composition.

Embodiment 9: aqueous coating composition according to any of the preceding embodiments, wherein the at least one di- and/or polyfunctional monomeric primary and/or secondary amine (A1) consists of at least 65 mol-%, preferably at least 75 mol-%, more preferably at least 90 mol-%, very preferably 100 mol-% of amines consisting of amino groups and hydrocarbon radicals.

Embodiment 10: aqueous coating composition according to any of the preceding embodiments, wherein the at least one di- and/or polyfunctional monomeric primary and/or secondary amine (A1) is selected from difunctional monomeric primary and/or secondary amines, preferably difunctional monomeric primary amines, very preferably isophorone diamine and/or m-xylylenediamine.

Embodiment 11: aqueous coating composition according to any of the preceding embodiments, wherein the proportion of the at least one di- and/or polyfunctional monomeric primary and/or secondary amine (A1), in the aqueous dispersion (B), preferably isophorone diamine and/or m-xylylenediamine, is from 1 to 4.5% by weight, preferably 1.5 to 4% by weight, based on the total weight of the aqueous dispersion (B).

Embodiment 12: aqueous coating composition according to any of the preceding claims, wherein the resin component (RC) has an NH equivalent of 160 to 350 g/mol, preferably 170 to 250 g/mol.

Embodiment 13: aqueous coating composition according to any of the preceding embodiments, wherein the resin component (RC) further contains at least one polyfunctional organic amine (A3) having primary and/or secondary amino groups, said polyfunctional organic amine (A3) being the reaction product of:

(iii) at least one di- and/or multifunctional epoxy resin (ER2) having an average epoxy equivalent weight of less than 400 g/mol, and (iv) at least one di- and/or polyfunctional monomeric primary and/or secondary amine (A1).

Embodiment 14: aqueous coating composition according to any of the preceding embodiments, wherein the resin component (RC) consists of the at least one polyfunctional organic amine (A2) having primary and/or secondary amino groups and the at least one polyfunctional organic amine (A3) having primary and/or secondary amino groups.

Embodiment 15: aqueous coating composition according to any of the preceding embodiments, wherein the at least one di- and/or multifunctional epoxy resin (ER2) has an average epoxy equivalent weight of less than 350 g/mol, preferably less than 300 g/mol, more preferably less than 250 g/mol, even more preferably less than 200 g/mol, very preferably 160 to 200 g/mol, as determined according to DIN EN ISO 3001:2019-08.

Embodiment 16: aqueous coating composition according to any of the preceding embodiments, wherein the at least one di- and/or multifunctional epoxy resin (ER2) has—on average—1 to 5 epoxy functions, preferably 1 to 4 epoxy functions, more preferably 1 to 3 epoxy functions, very preferably 2 epoxy functions.

Embodiment 17: aqueous coating composition according to any of the preceding embodiments, wherein the at least one di- and/or multifunctional epoxy resin (ER2) is selected from glycidyl ethers of dihydric alcohols or phenols, novolaks, diglycidyl esters of carboxylic acids or mixtures thereof, preferably glycidyl ethers of phenols, very preferably glycidyl ethers of bisphenol A.

Embodiment 18: aqueous coating composition according to any of the preceding embodiments, wherein X in the at least one compound X—R is selected from primary or secondary amino groups, hydroxyl groups, carboxylic acid groups or thiol groups, preferably primary amino groups.

Embodiment 19: aqueous coating composition according to any of the preceding embodiments, wherein the at least one polyoxyalkylene unit in the organic radial R in the at least one compound X—R is selected from polyethylene units, polypropylene units and mixed polyethylene/polypropylene units.

Embodiment 20: aqueous coating composition according to any of the preceding embodiments, wherein R in the at least one compound X—R consists of polyoxyalkylene units.

Embodiment 21: aqueous coating composition according to any of the preceding embodiments, wherein the at least one compound X—R is selected from primary polyoxyalkylene monoamines.

Embodiment 22: aqueous coating composition according to any of the preceding embodiments, wherein the at least one compound X—R has a weight average molecular weight Mw of 800 to 2,200 g/mol, as determined by GPC coupled to light scattering.

Embodiment 23: aqueous coating composition according to any of the preceding embodiments, wherein the least one polyfunctional organic amine (A2) having primary and/or secondary amino groups consists of the reaction product of components (i), (ii) and (iii).

Embodiment 24: aqueous coating composition according to any of the preceding embodiments, wherein the least one dispersion (B) has a solids content of 25 to 45% by weight, based on the total weight of dispersion and determined according to DIN EN ISO 3251:2018-07.

Embodiment 25: aqueous coating composition according to any of the preceding embodiments, wherein the resin component (RC) is present in a total amount of 10 to 30% by weight, preferably 15 to 25% by weight, based in each case on the solids content of the aqueous coating composition.

Embodiment 26: aqueous coating composition according to any of the preceding embodiments, wherein the at least one aromatic compound (C) further comprises at least one hydroxy group.

Embodiment 27: aqueous coating composition according to any of the preceding embodiments, wherein the at least one aromatic compound (C) is selected from resorcinol, salicylic acid, p-hydroxybenzoic acid, 2,4-dihydroxybenzoic acid, 2,5-dihydroxybenzoic acid, 2,6-dihydroxybenzoic acid, 3,4-dihydroxybenzoic acid, 3,5-dihydroxybenzoic acid, 3,4,5-trihydroxybenzoic acid, 2-hydroxy-3-naphthoic acid, 2-hydroxy-6-naphthoic acid, cresotic acids and mixtures thereof, preferably salicylic acid.

Embodiment 28: aqueous coating composition according to any of the preceding embodiments, wherein the at least one aromatic compound (C) is present in a total amount of 0.1 to 5% by weight, preferably 0.2 to 3% by weight, more preferably 0.3 to 1% by weight, very preferably 0.4 to 0.7% by weight, based in each case on the total weight of the aqueous coating composition.

Embodiment 29: aqueous coating composition according to any of the preceding embodiments, wherein the molar ratio of NH groups of the resin compound (RC) to the epoxy groups of the epoxy resin (ER1) is from 0.74:1 to 0.95:1, preferably 0.9:1.

Embodiment 30: aqueous coating composition according to any of the preceding embodiments, wherein the coating composition further comprises at least one pigment and/or filler.

Embodiment 31: aqueous coating composition according to embodiment 30, wherein the at least one pigment is selected from (i) black pigments such as carbon black, iron oxide pigments, manganese black and spinel black, preferably carbon black and iron oxide pigments; (ii) white pigments such as titanium dioxide, zinc oxide, zinc sulfide and antimony trioxide, preferably titanium dioxide; and (iii) mixtures thereof.

Embodiment 32: aqueous coating composition according to embodiment 30 or 31, wherein the at least one filler is selected from (i) carbonates such as calcium carbonate or barium carbonate; (ii) sulfates such as calcium sulfate and barium sulfate, (iii) silicates and sheet silicates such as talc, pyrophyllite, mica, kaolin, precipitated calcium silicates, aluminum silicates, calcium/aluminum silicates, sodium/aluminum silicates and mullite; (iv) silicas such as quartz, cristobalite, precipitated silicas and fumed silicas; (v) metal oxides and hydroxides such as aluminum hydroxide and magnesium hydroxide; and (vi) mixtures thereof.

Embodiment 33: aqueous coating composition according to any of embodiments 30 to 32, wherein the at least one pigment, preferably at least one white and/or black pigment, is present in a total amount of 15 to 20% by weight, preferably 20% by weight, based in each case on solids content of the aqueous coating composition.

Embodiment 34: aqueous coating composition according to any of embodiments 30 to 33, wherein the at least one filler is present in a total amount of 30 to 50% by weight, preferably 30 to 40% by weight, based in each case on solids content of the aqueous coating composition.

Embodiment 35: aqueous coating composition according to any of the preceding embodiments, wherein the coating composition further comprises at least one additive.

Embodiment 36: aqueous coating composition according to embodiment 35, wherein the at least one additive is selected from light stabilizers, antioxidants, deaerating agents, emulsifiers, slip additives, polymerization inhibitors, adhesion promoters, leveling agents, film-forming auxiliaries, thickeners, sag control agents (SCAs), corrosion inhibitors and mixtures thereof.

Embodiment 37: aqueous coating composition according to any of the preceding embodiments, wherein the coating composition has a solids content of 70 to 85% by weight, based on the total weight of aqueous coating composition and determined according to DIN EN ISO 3251:2018-07.

Embodiment 38: aqueous coating composition according to any of the preceding embodiments, wherein the coating composition is a surfacer or primer-surfacer.

Embodiment 39: kit-of-parts, comprising two separate components A) and B):

A) at least one aqueous base varnish containing at least one aqueous dispersion (A) of an epoxy resin (ER1), said epoxy resin (ER) having—on average—at least one epoxy group per molecule; and B) at least one aqueous hardener component containing at least one aqueous resin dispersion (B) comprising at least one di- and/or polyfunctional monomeric primary and/or secondary amine (A1) in a proportion by weight of 0.5 to 5% and a resin component (RC) having an NH equivalent of 150 to 400 g/mol, the resin component (RC) comprising at least one polyfunctional organic amine (A2) having primary and/or secondary amino groups, said at least one polyfunctional organic amine (A2) containing the reaction product of:

(i) at least one di- and/or multifunctional epoxy resin (ER2) having an average epoxy equivalent weight of less than 400 g/mol, (ii) at least one di- and/or polyfunctional monomeric primary and/or secondary amine (A3), and (iii) at least one compound X—R where X is a functional group reactive towards epoxy groups and R is an organic radical containing at least one polyoxyalkylene unit and not containing further X groups; and at least one aromatic compound (C) having at least one carboxylic acid group.

Embodiment 40: process for producing at least one coating layer on a substrate, said process comprising the following steps:

i) applying an aqueous coating composition according to any of embodiments 1 to 38 or a coating composition prepared from the kit-of-parts according to embodiment 39 to the substrate;

ii) forming a coating film from the coating composition applied in step (i);

iii) curing the coating film formed in step (ii);

iv) optionally sanding the cured coating layer obtained in step (iii); and v) optionally applying at least one further coating layer and curing said coating layer.

Embodiment 41: process according to embodiment 40, wherein the substrate is selected from (i) metallic substrates such as unalloyed and alloyed steels and/or iron, zinc and aluminum substrates and corresponding alloys; (ii) plastic substrates; (iii) substrates comprising metallic and plastic parts; and (iv) metallic substrates painted with a multilayer coating and preferably having defects.

Embodiment 42: process according to embodiment 40 or 41, wherein the film formation in step (ii) is performed by drying and/or flashing off the applied coating composition at 15 to 25° C. for 1 to 60 minutes.

Embodiment 43: process according to any of embodiments 40 to 42, wherein the curing in step (iii) is performed at a temperature of 15 to 180° C., preferably 20 to 80° C., more preferably 20 to 65° C. for a duration of 20 minutes to 16 hours, preferably 20 to 80 minutes.

Embodiment 44: process according to any of embodiments 40 to 43, wherein the dry film thickness of the cured coating layer resulting after step (iii) is from 5 to 200 μm, preferably 10 to 150 μm, very preferably 30 to 80 μm.

Embodiment 45: process according to any of embodiments 40 to 44, wherein the at least one further coating layer applied and cured in step (v) is selected from colored basecoat layers and/or clearcoat layers.

Embodiment 46: process according to any of embodiments 40 to 45, wherein the process is used to repair a multilayer paint system having at least one defective site.

Embodiment 47: coated substrate produced by a process as claimed according to any of embodiments 40 to 46.

Examples

The present invention will now be explained in greater detail through the use of working examples, but the present invention is in no way limited to these working examples. Moreover, the terms "parts", "%" and "ratio" in the examples denote "parts by mass", "mass %" and "mass ratio" respectively unless otherwise indicated.

1. Methods of Determination:

1.1 Solids Content (Solids, Nonvolatile Fraction)

Unless stated otherwise, the solids content (also called proportion of solids, solid-state content, proportion of nonvolatiles) was determined to DIN EN ISO 3251: 2018-07 at 130° C.; 60 min, starting weight 1.0 g.

1.2 Proportion of Monomeric Amine (A1) in the Aqueous Dispersion (B)

The proportion of the at least one di- and/or polyfunctional monomeric primary and/or secondary amine (A1) in the aqueous dispersion (B) is determined by gas chromatography according to DIN 51405:2004-01 as follows:

About 100 to 500 mg of the respective aqueous dispersion (B) (according to amine content) are weighed accurately to 0.1 mg into a 5 mL snaplid bottle on an analytical balance. About 5% ISTD diethylene glycol dimethyl ether are weighed accurately to 0.1 mg into the sample. The samples are diluted with 5 mL of THF (should the sample not dissolve in THF, a suitable solvent has to be found by experiments).

The sample thus prepared is analyzed on an Agilent 7890 gas chromatograph. Injection is effected by means of an automatic sampler. The samples are injected directly into the split injector of a gas chromatograph with a flame ionization detector and separated both on a column with polar phase (polyethylene glycol; 50 m fused silica capillary column with polyethylene glycol phase) and on a nonpolar phase (polydimethylsiloxane; 50 m fused silica capillary column with polydimethylsiloxane phase). Evaluation is effected by the ISTD % method.

Gas Chromatography Conditions:

Oven program: 40° C. (hold time 5 min) (3°/min)→100° C. (10°/min)→230° C. (hold time 5 min), Carrier gas: Hydrogen, Separating columns: Agilent Innowax: length 50 m, film thickness 0.2 µm, diameter 0.2 mm, pressure 1.0 bar HP-1, length 50 m, film thickness 0.33 µm, diameter 0.2 mm, pressure 1.3 bar, Injector temperature: 250° C. (lower if required), Injection volume: 0.3 µL (manual injection 0.3-0.6 µL), Detector: flame ionization detector, Detector temperature: 275° C., Split flow: 15 mL/minute The amines (A1) are identified by their retention times on the polar and nonpolar column. For unknown components, a GC/MS analysis has to be conducted.

An internal standard containing the detected amines is weighed accurately to 0.1 mg in accordance with the approximate ratios in the sample on an analytical balance. The concentration of the amines in the overall calibration solution was to correspond to that of the amines in the sample prepared (the concentrations of the amines are calculated by the GC analyzer program). Subsequently, the calibration solution is analyzed under the same conditions as the sample and the substance-specific correction factors are ascertained.

The amine contents of the sample are calculated with the aid of the GC analyzer program by the ISTD % method.

1.3 Epoxy Equivalent Weight

The epoxy equivalent weight was determined according to ASTM D1652-11(2019) for epoxy resin (ER1) and according to DIN EN ISO 3001:2019-08 for epoxy resin (ER2).

1.4 Proportion of Resin Component (RC) in the Aqueous Dispersion (B)

The determination was performed as described in point 1.1, except that the respective aqueous dispersion (B) was kept at 130° C. for 8 hours (rather than 60 min). This assures that the amount of nonvolatile monomeric amines (A1) remaining is negligibly small and the obtained weight corresponds to the proportion of the resin component (RC) present in the aqueous dispersion (B).

1.5 NH Equivalent

The NH equivalent of the resin component (RC) is determined according to the following two-step method:

Step 1:

First of all, the NH equivalent of the resin mixture (I) present in aqueous dispersion is determined. For this purpose, the different proportions by mass of primary and secondary amino groups (each as % nitrogen) in the aqueous dispersion is determined according to DIN EN ISO 9702 (October 1998) using the method for aliphatic amines. The proportions by mass obtained are then used to obtain the molar amount of NH groups in 100 g of the aqueous dispersion using the following equation:

$$n(NH)=(m(N \text{ from primary amino groups})/(14 \text{ g/mol}))*2+m(N \text{ from secondary amino groups})/(14 \text{ g/mol})$$

In this equation "m" represents the proportion by mass measured for the primary and secondary amino groups Using the molar amount of NH groups and the mass of sample (100 g), the NH equivalent of the sample (aqueous dispersion (B)), i.e. the mass of the sample in which there is 1 mol of NH functions, can be obtained.

Via the determination of the proportion of the resin mixture (I) of the sample, the NH equivalent of the resin mixture (I) can then be calculated using the following equation:

$$NH \text{ equivalent(resin mixture (I)}=NH \text{ equivalent (sample)}*proportion \text{ (resin mixture (I) in sample)}$$

Step 2:

The NH equivalent of the resin component (RC) is then calculated from the previously determined NH equivalent of the resin mixture (I), the mass of the resin mixture (I) used in stage (B), the mass of component (IIb) used in stage (B), and the molar amount of epoxy groups used in component (IIb) (determined via the mass of component (IIb) used and the epoxy equivalent weight). This assumes a quantitative reaction of the epoxy groups of component (IIb) with the NH functions of the resin mixture (I). The total mass of resin component (RC) is obtained by addition of the mass of resin mixture (I) used and the mass of component (IIb) used.

1.6 Determination of Sandability

The coated substrates prepared as described in point 3.1 below were stored at 20° C. for 20 min before applying 09560 black control powder (from 3M) to the coated surface and dry sanding using an Excenter (FESTOOL LEX3), 5 mm excentric stroke, and sandpaper from RODIM, Standard P400 type, until the black control powder had been completely removed.

Sandability was determined by assessment of the sandpaper as follows:

0→no clogging (very good sandability)

1→minimal clogging (sandability still acceptable)

2→clogging, formation of small "nodules" (poor sandability)

3→severe clogging, formation of "nodules" (spacers) (very poor sandability)

The clogging of the coating material on the sandpaper is very readily identifiable via the use of the black control powder. No clogging means that the material sanded off is obtained as fine dust and hence does not clog the sandpaper and does not lead to residues that are difficult to remove on the coating surface.

1.7 Determination of Blisters after Constant Climate Test

The panels prepared as described in point 3.2 were stored over a period of 10 days in a conditioning chamber under CH test conditions according to DIN EN ISO 6270-2:2005-09. Within 1 hour after removal from the conditioning chamber, the panels were then inspected for blistering in accordance with DIN EN ISO 4628-2:2016-07.

The occurrence of blisters was assessed as follows through a combination of 2 values:

The number of blisters was evaluated by a quantitative figure from 1 to 5, with m1 denoting very few and m5 very many blisters.

The size of the blisters was evaluated by a size figure again from 1 to 5, with g1 denoting very small and g5 very large blisters.

The designation m0g0, accordingly, denotes a paint system which is blister-free after condensation-water storage, whereas the designation m1g1 denotes a paint system having very few small blisters.

1.8 Determination of Cross-Cut Adhesion after Constant Climate Test

The panels prepared as described in point 3.2 were stored over a period of 10 days in a conditioning chamber under CH test conditions according to DIN EN ISO 6270-2:2005-09. Within 1 hour after removal from the conditioning chamber, the cross-cut adhesion was then determined according to DIN EN ISO 2409:2013-06 (rating GT 0 to GT 5; GT 0=best score; GT 5=worst score).

1.9 Determination of Stone-Chip Resistance

Stone-chip resistance was determined according to ISO 20567-1 (Determination of stone-chip resistance of coatings—Part 1: Multi-impact testing (ISO 20567-1:2017) with 2 bar pressure and 2×500 g of grit.

1.10 Determination of Dry Film Thickness

The dry film thickness was determined with a Dualscope MP40, probe ED10 from Fischer according to DIN EN ISO 2808 of May 2007.

2. Preparation of Aqueous Dispersions (B)

2.1 Preparation of Aqueous Dispersion (B1)

The aqueous dispersion (B1) was prepared according to the following procedure: 683.00 g of Beckopox VEH 2849W (aqueous dispersion of a resin mixture (I), where the resin mixture contains 27.5% by weight of monomeric amines (isophoronediamine and xylylenediamine) and 72.5% by weight of polyamine and additionally has an NH equivalent of 108 g/mol) and 1663.77 g of demineralized water are combined in a reaction vessel, stirred continuously and kept at 95° C. for 1 hour. Subsequently, the mixture is cooled to 70° C. and a mixture of 163.44 g of bisphenol A diglycidyl ether-based epoxy resin having an average epoxy equivalent weight of 186.5 g/mol, 39.46 g of polyalkylene polyether epoxide based on polypropylene oxide having an average epoxy equivalent weight of 395 g/mol, 81.96 g of ethoxypropanol, 81.47 g of methyl ethyl ketone and 81.72 g of isobutanol is metered in continuously while stirring over a period of 4 hours, and the mixture is kept at 70° C. for a further 1 hour. The reaction product thus obtained is cooled down to 45° C. The viscosity of the product is 150 to 250 m Pes at 25° C.

In a subsequent process step, the solvents isobutanol and methyl ethyl ketone are removed from the product by distillation under reduced pressure. The resulting aqueous dispersion (B1) has a residual content of isobutanol and methyl ethyl ketone of <0.5% (gas chromatography).

The content of the monomeric amine (A1) in the aqueous dispersion is 2.4%, the content of the resin component (RC) is 31% by weight. The resin component additionally has an amine equivalent weight (NH equivalent weight) of 171 g/mol.

2.2 Preparation of Aqueous Dispersion (B2)

876.19 g of Beckopox VEH 2849W (aqueous dispersion of a resin mixture (I), said resin mixture contains 27.5% by weight of monomeric amines (A1) (isophoronediamine and xylylenediamine) and 72.5% by weight of polyfunctional organic amine (A2) and has an NH equivalent of 108 g/mol) and 2132.20 g of (demineralized) water are combined in a reaction vessel, stirred continuously and kept at 95° C. for 1 hour. Subsequently, a mixture of 233.41 g of bisphenol A diglycidyl ether-based epoxy resin having an average epoxy equivalent weight of 186.5 g/mol, 117.30 g of ethoxypropanol, 117.30 g methyl ethyl ketone, 117.30 g isobutanol and 58.21 g of salicylic acid was continuously added while stirring over the course of 4 hours. Afterwards, the obtained dispersion is cooled down to 30° C. under stirring.

In a subsequent process step, the process solvents ethoxypropanol, methyl ethyl ketone and isobutanol are removed from the dispersion by distillation under reduced pressure.

The content of the monomeric amine (A1) in the aqueous dispersion is 3% by weight (1.5% by weight of m-xylenediamine and 1.5% by weight of isophorone diamine), the content of the resin component (RC) is 32% by weight. The resin component has an amine equivalent weight (NH equivalent weight) of 171 g/mol.

3. Preparation of Aqueous Coating Compositions

With regard to the stated formulation constituents and their quantities, the following should be borne in mind: any reference to a commercial product is to exactly that commercial product, irrespective of the particular principal name selected for the constituent.

Inventive aqueous coating compositions (I1) and (I2) as well as comparative aqueous coating compositions (C1) and (C2) were prepared by mixing the base varnish (A) with the curing component (B), adding the additional water and intimate mixing. The prepared coating compositions were applied on a substrate and cured within an hour after their preparation. The ingredients of the base varnish (A) and the curing component (B) are listed in Table 1 below.

TABLE 1

| Ingredients used to prepare aqueous coating compositions I1, I2, C1 and C2 (amounts in % by weight) | | | | | |
| --- | --- | --- | --- | --- | --- |
| | | I1* | I2* | C1 | C2 |
| Base varnish (A) | D.E.R. 917 Epoxy Resin[1] | 32.0 | 32.0 | 32.0 | 32.0 |
| | Demineralized water | 14.5 | 14.5 | 14.5 | 14.5 |
| | Additol VXW 6208[2] | 1.00 | 1.00 | 1.00 | 1.00 |
| | BYK 011, 29%[3] | 0.30 | 0.30 | 0.30 | 0.30 |
| | Texanol | 0.50 | 0.50 | 0.50 | 0.50 |
| | Micro talc IT extra[4] | 13.1 | 13.1 | 13.1 | 13.1 |
| | Titan rutil TR 81[5] | 23.8 | 23.8 | 23.8 | 23.8 |
| | Bayferrox 316[6] | 2.00 | 2.00 | 2.00 | 2.00 |
| | Blanc fixe N[7] | 7.00 | 7.00 | 7.00 | 7.00 |
| | Heucophos ZP0[8] | 4.80 | 4.80 | 4.80 | 4.80 |
| | Heucorin RZ[9] | 0.50 | 0.50 | 0.50 | 0.50 |
| | BYK-333, 100%[10] | 0.50 | 0.50 | 0.50 | 0.50 |
| Curing component (B) | Aqueous dispersion (B1) | 50.16 | — | 50.16 | — |
| | Aqueous dispersion (B2)[11] | — | 45.65 | — | — |
| | Beckopox EH 2189 W/50WA[12] | — | — | — | 12.27 |
| | Salicylic acid 32% in ethoxypropanol | 2.85 | — | — | — |
| | Ancamine K54[13] | — | — | 1.14 | — |
| | Butyl glycol | — | 2.20 | 1.43 | 0.36 |
| | Demineralized water | 3.99 | 7.15 | 4.28 | 1.48 |

TABLE 1-continued

Ingredients used to prepare aqueous coating compositions
I1, I2, C1 and C2 (amounts in % by weight)

| | I1* | I2* | C1 | C2 |
|---|---|---|---|---|
| Additional demineralized water | 2.00 | 2.00 | 2.00 | 25.00 |
| Amount of catalyst [% by weight][14] | 0.6 | 0.5 | 0.7 | 0.9 |
| Flow time DIN4 cup [s] | 20 | 22 | 20 | 22 |

*inventive
[1] aqueous emulsion of liquid bisphenol A based epoxy resin, EEW = 193-204 g/eq (Blue Cube Germany)
[2] polymer non-ionic dispersing additive, 50% solid content (Allnex Belgium S.A)
[3] silicone-free, polymer-based defoamer (Byk Chemie GmbH)
[4] hydrated magnesium silicate, $D_{50}$ = 1.8 μm (Elementis)
[5] rutile $TiO_2$, inorganic coating of zirconium and alumina, organic treatment (Huntsman)
[6] powdery iron oxide black pigment (Lanxess AG)
[7] precipitated barium sulfate, average particle size 1.7 μm (Solvay)
[8] organic modified basic zinc orthophosphate hydrate (Heubach GmbH)
[9] zinc-5-nitroisophthalate (Heubach GmbH)
[10] polyether modified polydimethylsiloxane (BYK Chemie GmbH)
[11] contains 1.6% by weight of salicylic acid
[12] amine resin, contains the reaction product of an amine having at least one primary and/or at least one secondary amino group, an adduct of a polyalkylene ether polyol and an epoxide resin and salicylic acid; NH-equivalent: 138 g/mol, amount of salicylic acid based on solid content: 10 to 15% by weight (Allnex Belgium S.A.)
[13] (tris-2,4,6-dimethylaminomethyl phenol) (Evonik Industries AG)
[14] amount of curing catalyst salicylic acid or Ancamine K54

3. Preparation of Coated Substrates from Coating Compositions I1, I2, C1 and C2

3.1 Preparation of Coated Substrates C-I1, C-I2, C-C1 and C-C2 for Sandability

Sandability was tested on coated substrates obtained according to the following procedure:

Cold rolled steel panels (60 cm×50 cm) were used as substrates. These were pretreated/cleaned as follows: cleaning with 360-4 Glasurit metal cleaner, sanding with P80 from Mirka, gold type, cleaning again to remove sanding dust with 360-4 Glasurit. Venting for 15 min.

The respective coating compositions I1, I2, C1 and C2 were each stirred up and painted onto the substrate in a thin, continuous spraying operation with a standard painting gun (for example SATA 100 B F 1.6 mm RP, at 2.0 bar), flashed off for 5 min, painted in a further full spraying operation, flashed off for 5 min and then cured at a temperature of 60° C. for 35 minutes. The dry film thickness was in each case between 60 and 80 μm.

Prior to determination of the sandability as described in point 1.6, the prepared panels were stored for 20 minutes (in case of curing at 60° C.) or 16 hours (in case of curing at 23° C.) at 23° C.

3.2 Preparation of Coated Substrates C-I1, C-I2, C-C1 and C-C2 for Stone-Chip Resistance and Humidity Tests First, the substrate is cleaned according to its material type, i.e. metallic substrates are cleaned with Glasurit Sheet Metal Cleaner 360-4, plastic parts with Glasurit Universal Cleaner for Plastics 541-30, old paintwork or factory-primed new parts with Glasurit KH Remover for Silicone and Tar 541-5.

Afterwards, the substrate is sanded according to its material type: sheet steel with P80, galvanised sheet steel with sanding pad, aluminum with P150, plastics and old paintwork or factory-primed new parts with a sanding pad. The sanding dust is then removed using the afore-stated cleaning agents. After dry rubbing, the application of the respective aqueous primer surfacer composition I1, I2, C1 or C2 is performed. For this purpose, the respective composition is applied with a flow cup gun (SATA BF 100 RP 1.6 with 2.0 bar) in two full coats without intermediate flash-off time such that a resulting dry film thickness of 60 and 80 μm is obtained. After application of the second coat, the obtained primer surfacer layer is cured at 60° C. for 40 minutes.

After cooling the coated substrates, the primer surfacer layer is sanded. For this purpose control black (09560 Black Fa. 3M) is applied to the coated surface and the surface is sanded using an eccentric sander (LEX3 from Festool), 5 mm strokes and sandpaper P400 (type standard from RODIM). The sanded surface is afterwards cleaned with Glasurit Cleaner 700-1 before application of a base coat layer. For this purpose, a commercially available water-based basecoat composition (Glasurit 90-1250 Deep Black, available from BASF Coatings GmbH) is applied with a paint spray gun (SATA 5000 HVLP 1.3 with 2.0 bar) in two covering coats and one effect coat with a flash-off time of approximately 5 minutes such that the resulting dry film thickness is between 10 and 15 μm.

Subsequently, a commercially available solvent-based clear coating composition (Glasurit HS Clear Coat High Gloss VOC 923-630, available from BASF Coatings GmbH) is applied with a paint spray gun (SATA 5000 RP 1.3 with 2.0 bar) in two coats with an intermediate flash-off time of 3 minutes in a dry film thickness of 50 to 60 μm. Final curing of the applied basecoat and clearcoat layers is performed at 60° C. for 30 minutes.

Prior to performing the humidity tests and stone-chip resistance, the prepared panels were aged for at least 10 days at 23° C.

4. Results

The results obtained for the sandability, blistering, cross-cut adhesion and stone chipping resistance of the coated panels prepared as previously described are listed in Table 2:

TABLE 2

Results for sandability, blistering, cross-cut adhesion
and stone-chip resistance (in the upper half of this table,
only the differences with regard to the ingredients of
the inventive and comparative examples are listed)

| | Inventive coated panels | | Comparative coated panels | |
|---|---|---|---|---|
| | C-I1 | C-I2 | C-C1 | C-C2 |
| Aqueous dispersion (B1) | 50.16 | — | 50.16 | — |
| Aqueous dispersion (B2) | — | 45.65 | — | — |
| Beckopox EH 2189 W/50WA | — | — | — | 12.27 |
| Salicylic acid 32% in ethoxypropanol | 2.85 | — | — | — |
| Ancamine K54 | — | — | 1.14 | — |
| Butyl glycol | — | 2.20 | 1.43 | 0.36 |
| Demineralized water | 3.99 | 7.15 | 4.28 | 1.48 |
| Additional demineralized water | 2.00 | 2.00 | 2.00 | 25.00 |
| Amount of catalyst [% by weight] | 0.6 | 0.5 | 0.7 | 0.9 |
| Sandability | 0 | 0 | 0 | 0 |
| Blistering after constant climate test | m0g0 | m0g0 | m4g2 | m1/g1-4 |
| Cross-cut adhesion after constant climate test | GT0 | GT0 | GT4 | GT5 |
| Stone chipping resistance | 2 | 2 | 2 | 3 |

5. Discussion of the Results

Coated panels prepared by using the inventive coating compositions (I1) and (I2) shown an excellent sandabilty as well as a high stone chipping resistance without negatively influencing the excellent blistering stability and cross-cut adhesion of multilayer coating prepared by using said inventive coating compositions as primer-surfacer. The achieved excellent properties are due to a combination of an aqueous dispersion (B) containing a specific resin component (RC) and salicylic acid as curing catalyst. Surprisingly, comparable results are obtained if salicylic acid is not added as a separate compound during preparation of the coating composition (coating composition I1) but incorporated via the aqueous dispersion (B2) (coating composition I2). Since salicylic acid is known to catalyze the reaction between epoxy and amino groups, the use of salicylic acid during the preparation of the aqueous dispersion (B) without negatively influencing the catalytic activity during curing of the coating composition allows to an efficient preparation of the aqueous dispersion (B) without the use of further catalysts.

In contrast, the use of the known curing catalyst Ancamine K54 in combination with the aqueous dispersion (B) as crosslinking agent (comparative coating composition C1) results in coated panels having a significantly reduced blistering stability and cross-cut adhesion under humidity conditions as compared to panels coated with the inventive coating compositions (I1) or (I2) comprising salicylic acid as curing catalyst.

Use of an aqueous dispersion of the curing agent not comprising the specific resin component (RC) (comparative coating composition C2) in combination with salicylic acid as curing catalyst also results in significantly reduced blistering stability, cross-cut adhesion and stone chipping resistance.

Thus, an excellent sandability as well as a high stone chipping resistance without negatively influencing the high blistering stability and cross-cut adhesion of multilayer coatings are only obtained if the primer-surfacer contains a combination of an aqueous dispersion (B) comprising a specific resin component (RC) and salicylic acid as curing catalyst.

The invention claimed is:

1. An aqueous coating composition comprising:
   a) at least one aqueous dispersion (A) of an epoxy resin (ER1), said epoxy resin (ER) having on average at least one epoxy group per molecule,
   b) at least one aqueous resin dispersion (B) comprising at least one di- and/or polyfunctional monomeric primary and/or secondary amine (A1) in a proportion by weight of 0.5 to 5% and a resin component (RC) having an NH equivalent of 150 to 400 g/mol and
   c) at least one aromatic compound (C) having at least one carboxylic acid group,
   wherein
   the resin component (RC) comprises at least one polyfunctional organic amine (A2) having primary and/or secondary amino groups, said at least one polyfunctional organic amine (A2) containing the reaction product of:
   (i) at least one di- and/or multifunctional epoxy resin (ER2) having an average epoxy equivalent weight of less than 400 g/mol,
   (ii) at least one di- and/or polyfunctional monomeric primary and/or secondary amine (A1), and
   (iii) at least one compound X—R where X is a functional group reactive towards epoxy groups and R is an organic radical containing at least one polyoxyalkylene unit and not containing further X groups.

2. The aqueous coating composition according to claim 1, wherein the epoxy resin (ER1) is present in a total amount of 1 to 30% by weight based on the total weight of the aqueous coating composition.

3. The aqueous coating composition according to claim 1, wherein the at least one di- and/or polyfunctional monomeric primary and/or secondary amine (A1) comprises at least 65 mol-% of amines consisting of amino groups and hydrocarbon radicals.

4. The aqueous coating composition according to claim 1, wherein the at least one di- and/or polyfunctional monomeric primary and/or secondary amine (A1) is selected from the group consisting of difunctional monomeric primary and/or secondary amines.

5. The aqueous coating composition according to claim 1, wherein the proportion of the at least one di- and/or polyfunctional monomeric primary and/or secondary amine (A1) in the aqueous dispersion is from 1 to 4.5% by weight based on the total weight of the aqueous dispersion (B).

6. The aqueous coating composition according to claim 1, wherein the resin component (RC) has an NH equivalent of 160 to 350 g/mol.

7. The aqueous coating composition according to claim 1, wherein the at least one di- and/or multifunctional epoxy resin (ER2) is selected from the group consisting of glycidyl ethers of dihydric alcohols or phenols, novolaks, and diglycidyl esters of carboxylic acids or mixtures thereof.

8. The aqueous coating composition according to claim 1, wherein the at least one compound X—R is selected from the group consisting of primary polyoxyalkylene monoamines.

9. The aqueous coating composition according to claim 1, wherein the resin component (RC) is present in a total amount of 10 to 30% by weight based on the solids content of the aqueous coating composition.

10. The aqueous coating composition according to claim 1, wherein the at least one aromatic compound (C) is selected from the group consisting of resorcinol, salicylic acid, p-hydroxybenzoic acid, 2,4-dihydroxybenzoic acid, 2,5-dihydroxybenzoic acid, 2,6-dihydroxybenzoic acid, 3,4-dihydroxybenzoic acid, 3,5-dihydroxybenzoic acid, 2-hydroxy-3-naphthoic acid, 3,4,5-trihydroxybenzoic acid, 2-hydroxy-6-naphthoic acid, cresotic acids and mixtures thereof.

11. The aqueous coating composition according to claim 1, wherein the at least one aromatic compound (C) is present in a total amount of 0.1 to 5% by weight based on the total weight of the aqueous coating composition.

12. The aqueous coating composition according to claim 1, wherein the coating composition is a surfacer or primer-surfacer.

13. A kit-of-parts, comprising two separate components A) and B):
   A) at least one aqueous base varnish containing at least one aqueous dispersion (A) of an epoxy resin (ER1), said epoxy resin (ER) having on average at least one epoxy group per molecule; and
   B) at least one aqueous hardener component containing at least one aqueous resin dispersion (B) comprising at least one di- and/or polyfunctional monomeric primary and/or secondary amine (A1) in a proportion by weight of 0.5 to 5% and a resin component (RC) having an NH equivalent of 150 to 400 g/mol, the resin component (RC) comprising at least one polyfunctional organic amine (A2) having primary and/or secondary amino groups, said at least one polyfunctional organic amine (A2) containing the reaction product of:
   (i) at least one di- and/or multifunctional epoxy resin (ER2) having an average epoxy equivalent weight of less than 400 g/mol,
   (ii) at least one di- and/or polyfunctional monomeric primary and/or secondary amine (A3), and
   (iii) at least one compound X—R where X is a functional group reactive towards epoxy groups and R is an organic radical containing at least one polyoxyalkylene unit and not containing further X groups; and at least one aromatic compound (C) having at least one carboxylic acid group.

14. A process for producing at least one coating layer on a substrate, said process comprising the following steps:

i) applying an aqueous coating composition according to claim 1 to the substrate;

ii) forming a coating film from the coating composition applied in step (i);

iii) curing the coating film formed in step (ii);

iv) optionally sanding the cured coating layer obtained in step (iii); and v) optionally applying at least one further coating layer and curing said coating layer.

15. A coated substrate produced by the process as claimed according to claim 14.

16. A process for producing at least one coating layer on a substrate, said process comprising the following steps:

i) applying a coating composition prepared from the kit-of-parts according to claim 13 to the substrate;

ii) forming a coating film from the coating composition applied in step (i);

iii) curing the coating film formed in step (ii);

iv) optionally sanding the cured coating layer obtained in step (iii); and v) optionally applying at least one further coating layer and curing said coating layer.

17. A coated substrate produced by the process as claimed according to claim 16.

18. The aqueous coating composition according to claim 1, wherein the epoxy resin (ER1) is present in a total amount of 5 to 25% by weight based on the total weight of the aqueous coating composition.

19. The aqueous coating composition according to claim 1, wherein the epoxy resin (ER1) is present in a total amount of 8 to 20% by weight based on the total weight of the aqueous coating composition.

20. The aqueous coating composition according to claim 1, wherein the epoxy resin (ER1) is present in a total amount of 10 to 15% by weight based on the total weight of the aqueous coating composition.

* * * * *